(12) United States Patent
Yokura et al.

(10) Patent No.: US 7,927,461 B2
(45) Date of Patent: Apr. 19, 2011

(54) METHOD FOR MANUFACTURING AN ARAMID PAPER WITH AN APPLIED PLASMA TREATMENT

(75) Inventors: Miyoshi Yokura, Mie-ken (JP); Tetsuo Inoue, Mie-ken (JP)

(73) Assignee: Kawamura Sangyo Co., Ltd., Mie-Ken (JP)

( * ) Notice: Subject to any disclaimer, the term of this patent is extended or adjusted under 35 U.S.C. 154(b) by 836 days.

(21) Appl. No.: 11/812,456

(22) Filed: Jun. 19, 2007

(65) Prior Publication Data

US 2008/0000599 A1     Jan. 3, 2008

(30) Foreign Application Priority Data

Jun. 28, 2006   (JP) ................... 2006-178065

(51) Int. Cl.
*D21H 13/26*      (2006.01)

(52) U.S. Cl. .............. 162/192; 162/146; 162/157.3; 428/474.4

(58) Field of Classification Search .............. 162/157.3, 162/50, 146, 192; 428/474.4
See application file for complete search history.

(56) References Cited

U.S. PATENT DOCUMENTS

| | | | | |
|---|---|---|---|---|
| 5,622,775 A | * | 4/1997 | Burks et al. | 442/392 |
| 2005/0136233 A1 | * | 6/2005 | Samuels et al. | 428/212 |
| 2008/0107866 A1 | * | 5/2008 | Iwasa et al. | 428/141 |
| 2008/0182098 A1 | * | 7/2008 | Nakanishi et al. | 428/326 |
| 2010/0062206 A1 | * | 3/2010 | Tada et al. | 428/80 |

FOREIGN PATENT DOCUMENTS

| | | | |
|---|---|---|---|
| GB | 2053026 A | * | 2/1981 |
| JP | 60-096445 | | 5/1985 |
| JP | 03-162420 | | 7/1991 |
| JP | 07-032549 | | 2/1995 |
| JP | 07-299891 | | 11/1995 |
| JP | 08099389 A | * | 4/1996 |
| JP | 11-222798 | | 8/1999 |
| JP | 2003-31911 | | 1/2003 |
| JP | 2005-68236 | | 3/2005 |
| WO | WO 2006067970 A1 | * | 6/2006 |

OTHER PUBLICATIONS

English Translation of JP 08-099389, Feb. 15, 2009.*

(Continued)

*Primary Examiner* — Matthew J Daniels
*Assistant Examiner* — Anthony J Calandra
(74) *Attorney, Agent, or Firm* — Thomas & Karceski, P.C.

(57) ABSTRACT

An aramid paper made from aramid fibrid and short fiber and formed into a paper shape has two sides and a surface and includes a thermal bonding face located in at least one of the sides of the aramid paper, the thermal bonding face having such a property as to be directly thermally bondable with another sheet of aramid paper of the same material or a polyester film at a thermal bonding temperature ranging from 90° C. to 200° C. when a plasma treatment is applied to the surface of the aramid paper. The plasma treatment has an intensity ranging from 30 W·min/m² to 1500 W·min/m², and the thermal bonding face has a composition ratio (O/C) of the number of oxygen atoms (O) to the number of carbon atoms (C) ranging between 150% and 230% of a theoretical value of an atom number ratio.

14 Claims, 3 Drawing Sheets

OTHER PUBLICATIONS

Plawky et al., surface modification of an aramid fibre treated in a low-temperature microwave plasma, 1996, Journals of Material Science, whole document.*

UCLA LTPL, Low Temperature Plasma Technology Laboratory, [downloaded online Feb. 23, 2009], UCLA, whole document.*

Japanese Office Action for Japanese Patent Application No. 2006-178065, dated Dec. 18, 2009.

Chinese Office Action for Chinese Patent Application No. 200710137968.9, dated Apr. 8, 2010.

* cited by examiner

| | ARAMID PAPER (A) | | | POLYESTER FILM (B) | EVALUATION | |
|---|---|---|---|---|---|---|
| | PRODUCT NAME | PLASMA PROCESSING INTENSITY W·min/m² | O/C | RATIO TO THEORETICAL VALUE | PRODUCT NAME | INTERLAYER ADHESION | BENDING WORK ABILITY (APPEARANCE) |
| COMPARATIVE EXAMPLE 1 | NOMEX | — | 0.15 | 100 | LUMIRROR | × | × |
| EMBODIMENT 1 | NOMEX | 50 | 0.19 | 127 | LUMIRROR | △ | ○ |
| EMBODIMENT 2 | NOMEX | 130 | 0.27 | 174 | LUMIRROR | ○ | ○ |
| EMBODIMENT 3 | NOMEX | 650 | 0.31 | 206 | LUMIRROR | ◎ | ○ |
| EMBODIMENT 4 | NOMEX | 1120 | 0.32 | 213 | LUMIRROR | ○ | ○ |
| EMBODIMENT 5 | NOMEX | 1400 | 0.35 | 233 | LUMIRROR | △ | ○ |
| COMPARATIVE EXAMPLE 2 | NOMEX | 2050 | 0.38 | 253 | LUMIRROR | × | × |

FIG. 2

| | ARAMID PAPER (A) | | | | POLYESTER FILM (B) | EVALUATION | |
|---|---|---|---|---|---|---|---|
| | PRODUCT NAME | PLASMA PROCESSING INTENSITY W·min/m² | O/C | RATIO TO THEORETICAL VALUE | PRODUCT NAME | INTERLAYER ADHESION | BENDING WORK ABILITY (APPEARANCE) |
| COMPARATIVE EXAMPLE 3 | NOMEX | — | 0.15 | 100 | TEONEX | × | × |
| EMBODIMENT 6 | NOMEX | 50 | 0.19 | 127 | TEONEX | △ | ○ |
| EMBODIMENT 7 | NOMEX | 130 | 0.27 | 174 | TEONEX | ○ | ○ |
| EMBODIMENT 8 | NOMEX | 650 | 0.31 | 206 | TEONEX | ○ | ○ |
| EMBODIMENT 9 | NOMEX | 1120 | 0.32 | 213 | TEONEX | ○ | ○ |
| EMBODIMENT 10 | NOMEX | 1400 | 0.35 | 233 | TEONEX | △ | ○ |
| COMPARATIVE EXAMPLE 4 | NOMEX | 2050 | 0.38 | 253 | TEONEX | × | × |

FIG. 3

METHOD FOR MANUFACTURING AN ARAMID PAPER WITH AN APPLIED PLASMA TREATMENT

CROSS-REFERENCE TO RELATED APPLICATIONS

This application is based upon and claims the benefit of priority from the prior Japanese Patent Application No. 2006-178065 filed on Jun. 28, 2006, the entire contents of which are incorporated herein by reference.

BACKGROUND OF THE INVENTION

1. Field of the invention

This invention relates to aramid paper which is used as electrical insulating sheet (paper) for transformers, electric motors, generators, etc. and which is excellent in machine characteristics, resistance to heat, electrical insulation properties and chemical resistance, a method of manufacturing the aramid paper, and an aramid-polyester laminate.

2. Description of the related art

Heat-resistant synthetic insulating paper called "aramid paper" has recently been provided as an electrical insulating material. More specifically, for example, aromatic polyamide paper is known under the trademark of Nomex® owned by E. I. du Pont de Nemours and Company, U.S.A. (hereinafter, DuPont), for example, Nomex® #410 and #411. This aromatic polyamide paper has excellent machine characteristics and electrical insulation properties and has a thickness ranging from 2 to 20 mil. This aramid paper is used as an insulating material for transformers, electric motors and generators all of which necessitate high heat resistance performance belonging to type H (180° C.) in a heat resistance division of International Electrotechnical Commission (IEC) 85 (1984).

This aramid paper is made from masticated aramid (aromatic polyamide) fibrid and heat-resistant short fiber as main constituents by a wet papermaking process which is similar to a method of making Japanese paper. Furthermore, if necessary, these main constituents are heated and pressurized (calendaring) thereby to be commercialized. The aforenoted Nomex® #410 is a calendered product, whereas the aforenoted Nomex® #411 is a non-calendered product. Each of these aramid papers has a number of voids therein as normal paper does. Accordingly, each aramid paper necessarily has a lower electrical breakdown strength (KV/mm) per thickness than a film having the same quality and same thickness.

On the other hand, a polyester film (hereinafter, "PET film") such as polyethylene terephthalate or polyethylene naphthalate has a lower resistance to heat than the aramid paper and is classified into a type E (120° C.) in the heat resistance division of IEC 85 (1984). However, the PET film has a higher electrical breakdown strength and cost-effectiveness. The PET film is used for the purpose of insulation corresponding to the type E or lower types in a vast range.

Furthermore, insulating materials belonging to the type F (155° C.) have recently been desired. The insulating materials of the type F require lower resistance to heat than those of type H. Aramid paper has no problem if used in type F but is expensive. As a result, development of cheaper materials has been desired. The following materials have conventionally been proposed as cost-effective F type materials:

(a) A multilayer structure of aramid paper having high resistance to heat and to oxidation and a PET film having high electrical insulation. The aramid paper and the PET film are bonded together by an adhesive agent;

(b) An aramid laminate made by laying aramid paper and a PET film on each other and pressurizing and heating the laid aramid paper and PET film under the conditions of temperature ranging from 220° C. to 250° C. and linear pressure of 50 kg/cm or above so that the laid aramid paper and PET film are laminated by thermal adhesion thereby to be laminated. See JP-H07-32549A (1995), for example. The used aramid paper is meta-aramid paper, whereas the used PET film is a biaxially oriented PET film; and (c) A laminate made by laying on the surface of an aramid paper layer (layer A) a layer of PET welded or impregnated at the melting point and another PET film. Thereafter, both layers laid on each other are welded together at a roll temperature of 220° C. to 250° C. and pressure of 50 kg/cm or above and then quenched at 100° C./minute or above, thereby obtaining the laminate. See JP-H07-299891A (1995), for example.

In the above case (a), the aramid paper and PET film are affixed on each other by the adhesive agent. Since the adhesive agent is relatively harder, the elasticity of each of the aramid paper and PET film is damaged by the harder adhesive agent, whereupon the multilayer structure is disadvantageous in workability such as bending. Furthermore, when the multilayer structure is applied to oil-immersed equipment, components of the adhesive agent may be transferred to the oil, whereupon the usage of the multilayer structure is limited.

On the other hand, the aramid paper and the PET film are bonded together by thermal welding without use of an adhesive agent, so that the defect resulting from use of adhesive agent can be overcome. In the case (b), however, since the temperature of thermal welding is approximate to a melting point of PET (about 260° C.), variations in the dimensions of PET film are increased. This results in warpage, shrinkage or crease in the welded products. Furthermore, part of PET tends to be crystallized. As a result, it is difficult to obtain a stable quality. Since the temperature of thermal welding is also high in the above case (c), too, part of PET impregnated in the aramid paper is crystallized such that the excellent elasticity is damaged.

SUMMARY OF THE INVENTION

Therefore, an object of the present invention is to provide an aramid paper and a method of manufacturing aramid paper which can be thermally bonded together at a relatively lower temperature without use of bonding agent between the aramid paper and the similar material or polyester film. Another object of the invention is to provide an aramid-polyester laminate having high heat resistance of the aramid paper and high electrical resistance of polyester film and high elasticity.

The inventors repeated various experiments and researches in order to accomplish the foregoing object, that is, to obtain an aramid paper thermally bondable at a relatively lower temperature without use of adhesive agent. Consequently, although it had been considered to be impossible to thermally bond an aramid paper at a low temperature which is at or below 200° C., the inventors found that an aramid paper was thermally bondable at a low temperature such as about 150° C. without use of adhesive agent by applying a low-temperature plasma treatment to the surface of the aramid paper for the purpose of surface modification. The present invention was thus made.

The present invention provides an aramid paper made from aramid fibrid and short fiber both as main constituents and formed into a paper shape, the aramid paper having two sides and a surface and comprising a thermal bonding face provided on at least one of the sides of the aramid paper, the thermal bonding face being provided with such a property as to be directly thermally bondable with another sheet of aramid paper of the same material or a polyester film at a thermal bonding temperature ranging from 90° C. to 200° C. when a plasma treatment is applied to the surface of the aramid paper by a plasma treatment apparatus, wherein the plasma treatment has an intensity ranging from 30 W·min/m² to 1500 W·min/m², and the thermal bonding face has a composition ration (O/C) of the number of oxygen atoms (O) to the number of carbon atoms (C) ranging between 150% and 230% of a theoretical value of an atom number ratio.

Oxygen atoms are introduced into the surface of the aramid paper by application of the plasma treatment. As a result, a COOH group and a OH group are added to the surface of the aramid paper. This can be presumed to result in thermal adhesion between aramid papers or between aramid paper and polyester film (having a melting point of about 260° C.) at such a low thermal bonding temperature (between 90° C. and 200° C.) that cannot conventionally be expected.

In the present invention, the aramid paper is comprised of fibrid and short or discontinuous fiber as main constituents. The fibrid is comprised of poly-meta-phenyleneisophthalamide, a copolymer thereof or a mixed-copolymer thereof. The aramid is formed into the shape of paper (papermaking). No particular limitation should be provided regarding the copolymer of poly-meta-phenyleneisophthalamide, component to be mixed with poly-meta-phenyleneisophthalamide or blending quantity unless the properties of m-aramid are spoiled. Components to be blended include terephthalic acid, p-phenylenediamine, hexamethylene diamine, cyclohexamethylene diamine, etc. The m-aramid may contain inorganic salt, additive and filler, if necessary. Nomex® (trademark owned by DuPont, U.S.A.) and Teijincomex® (trademark owned by Teijin Limited, Japan) are commercially available currently.

In the plasma treatment, DC or AC high voltage is applied between electrodes so that a base material to be treated is exposed to discharge, for example, a corona discharge under atmospheric pressure or a glow discharge in a vacuum. In this case, since the treatment in the vacuum has a broader selection range of the treatment gas, the treatment in vacuum is preferred although the preference does not have any limiting purpose. The treatment gas may include one of or a mixture of two or more of helium (He) neon (Ne), argon (Ar), nitrogen (N), oxygen (O), carbon dioxide gas, air, moisture vapor, etc. However, the treatment gas should not be limited to these chemical agents. In particular, Ar or carbon dioxide gas is preferred from the view point of the discharge starting efficiency. A plasma treatment such as a glow discharge treatment if preferred from the view point of a treating efficiency. In the glow discharge treatment, discharge is continued under pressure ranging from 0.1 Pa to 1330 Pa. Another pressure range from 1 Pa to 266 Pa is more preferable.

More specifically, a desired thermal adhesiveness can be achieved when the thermal bonding face has a composition ratio (a measured value of O/C) of the number of oxygen atoms (O) to the number of carbon atoms (C) ranging between 150% and 230% of a theoretical value of an atom number ratio. The number of carbon atoms (C) and the number of oxygen atoms (O) are obtained by measurement on the surface of the aramid paper employing X-ray photoelectron spectroscopy (XPS). Furthermore, the theoretical value refers to the value of an atomic number ratio calculated from a repeating unit of high polymer chemistry formula. For example, Nomex® #410 type (manufactured by DuPont, U.S.A.) is a poly-meta-phenyleneisophthalamide. Accordingly, C/O/N=14/2/2. The theoretical value of the composition ratio X (O/C) of the number of oxygen atoms (O) to the number of carbon atoms (C) is obtained as 2/14=0.143 on the basis of carbon (C) The measured value is usually smaller than the theoretical value since a slight amount of hydrocarbon series is adherent on the surface.

The research accomplished by the inventors shows that desired thermal adhesiveness is obtained when the foregoing composition ratio X (O/C) ranges between 120% and 250% of the theoretical value, that is, is larger in the range of 20% to 150% than the theoretical value. The composition ratio more preferably ranges between 150% and 230%. Desired thermal adhesiveness is not obtained when the composition ratio X is below 120% of the theoretical value and above 250% of the theoretical value.

In another aspect, the invention provides a method of manufacturing an aramid paper which is directly thermally bondable with the same material or a polyester film at a thermal bonding temperature ranging from 90° C. to 200° C., the method comprising obtaining an aramid paper made from aramid fibrid and short fibers both as main constituents and formed into a paper shape, the aramid paper having two sides and a surface and a thermal bonding face provided on at least one of the sides of the aramid paper, and applying a plasma treatment to the aramid paper by a plasma treatment apparatus with an inner electrode, the plasma treatment having an intensity ranging from 30 W·min/m² to 1500 W·min/m², wherein the thermal bonding face has a composition ratio (O/C) of the number of oxygen atoms (O) to the number of carbon atoms (C) ranging between 150% and 230% of a theoretical value of an atom number ratio.

The plasma treatment equipment used in the plasma treatment step is preferably of an inner electrode type and the plasma treatment preferably has an intensity (output) ranging from 30 W·min/m² to 1500 W·min/m². Consequently, the above-mentioned range of the composition ration X can be obtained. The research accomplished by the inventors shows that the composition ratio X is rendered smaller when the intensity of the plasma treatment is lower than the above-mentioned range and that the composition ratio X is rendered larger when the intensity of the low-plasma treatment is higher than the above-mentioned range. Desirable thermal adhesiveness is not obtained in each case. The intensity of the low-plasma treatment more preferably ranges from 130 W·min/m² to 1200 W·min/m².

The invention further provides an aramid-polyester laminate comprising an aramid paper made from an aramid fibrid and short fiber both as main constituents and having a surface to which a plasma treatment is applied by a plasma treatment apparatus with an inner electrode so that the armid paper has at least one side including a thermal bonding face having a composition ratio (O/C) of the number of oxygen atoms (O) to the number of carbon atoms (C) ranging between 150% and 230% of a theoretical value of an atom number ratio, and a polyester film thermally bonded directly to the thermal bonding face of the aramid paper at a thermal bonding temperature ranging from 90° C. to 200° C. by thermal bonding, wherein the plasma treatment has an intensity ranging from 30 W·min/m² to 1500 W·min/m².

The aramid-polyester laminate of the invention can be used as a high-performance electrical insulating material. For example, the aramid-polyester laminate can be applied to transformers, electric motors, power generators, etc. In particular, the aramid-polyester laminate is suitable for use as a motor insulating material for hybrid cars equipped with an electric motor which is required to have high heat resistance and high hydrolysis characteristic. The thickness of the polyester film should not be limited and may be selected according to purpose, usage or the like.

The aforesaid polyester film is made by biaxially stretching a thermoplastic straight-chain polymer with main-chain ester binding, for example. This film includes polyethylene terephthalate (PET), polyethylene naphthalate (PEN) and polybutadiene terephthalate. Each film may contain a copolymer, additive for characteristic improvement (organic or inorganic filler, for example), plasticizer or the like. Alternatively, each film may not contain such copolymer, additive, plasticizer or the like. For example, a commercially available film includes films sold under the registered trademarks of Lumirror® (Toray Industries, Inc.), Tetoron® (Teijin Limited), Teonex® (Teijin DuPont Films).

A technique for improvement of the polyester film surface includes a corona treatment and a low-temperature plasma treatment. The treatment intensity (output) in the low-temperature plasma treatment can be selected according to a type of polyester film, a type of treating equipment and performance. The treatment equipment, electrodes and the like should not be limited but may be well known in the art.

The method of thermally bonding the polyester film directly to the aramid paper without use of adhesive agent should not be limited to the above-described manner. For example, one of known methods including hot press, hot roller, hot air, ultrasonic wave may be selected according to a purpose of the laminator. In this case, the aforesaid bonding temperature desirably takes a value which is equal to or as low as possible below the melting point of the polyester film. Consequently, the polyester film can be prevented from deterioration or the like, whereupon a high quality laminate can be obtained.

When symbol A refers to the aramid paper and symbol B refers to the polyester film, the combination of A and B includes patterns of A/A, A/B/A, B/A/B, A/A/B/A, and the like. Additionally, as described above, when the intensity of the plasma treatment is excessively high for the aramid paper of the composition ratio X is excessively large, adhesiveness is reduced between two sheets of the aramid paper and between the aramid paper and the polyester film, whereupon an interlayer peel tends to occur.

BRIEF DESCRIPTION OF THE DRAWINGS

Other objects, features and advantages of the present invention will become clear upon reviewing the following description of the embodiment with reference to the accompanying drawings, in which:

FIG. 2 is a table showing the experimental results of interlayer adhesion and bending work ability regarding an aramid-polyester laminate (No. 1); and FIG. 3 is a table showing the experimental results of interlayer adhesion and bending work ability regarding an aramid-polyester laminate (No. 2).

DETAILED DESCRIPTION OF THE INVENTION

Figure 1:
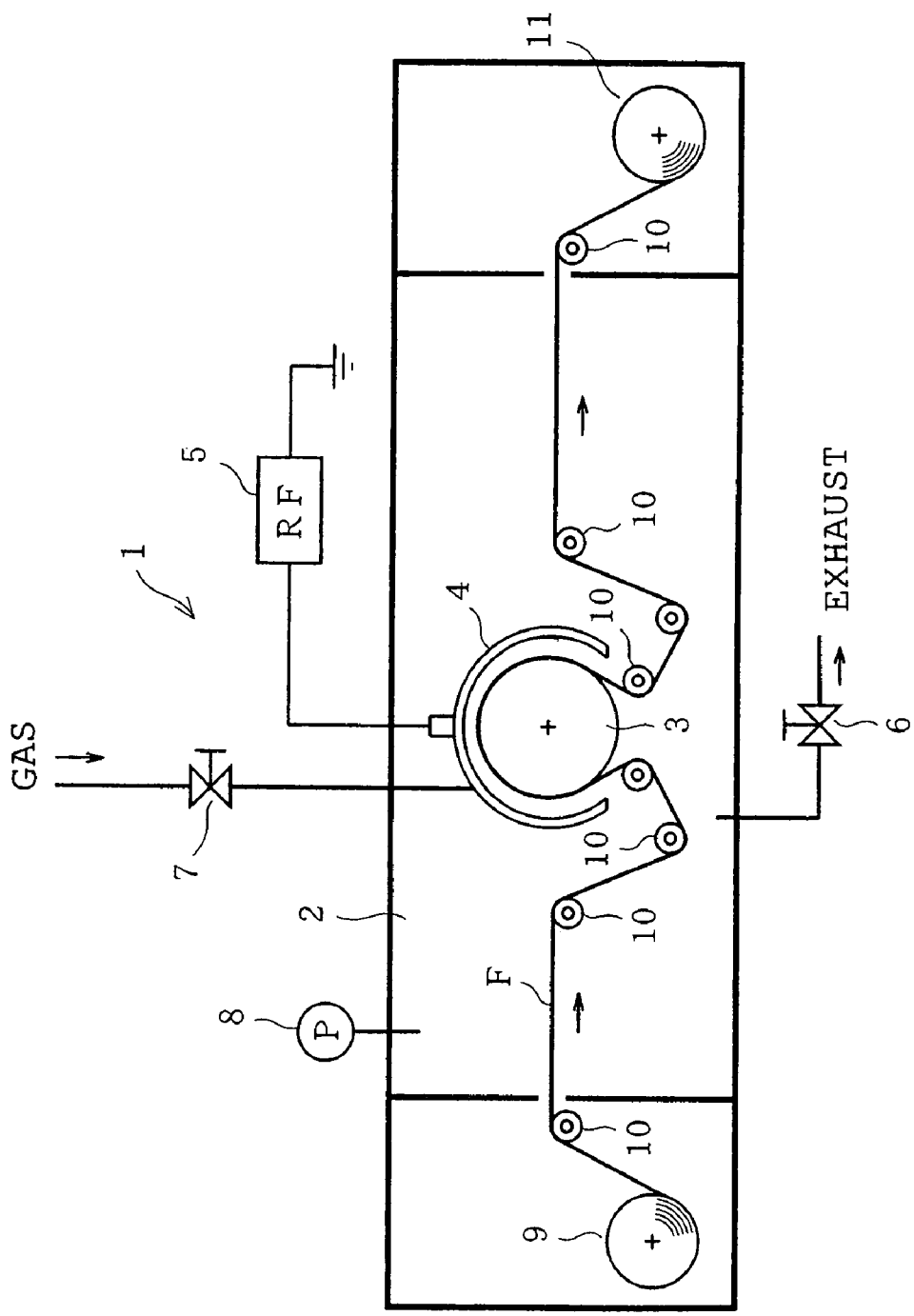
FIG. 1 is a schematic representation of low-temperature plasma treatment equipment employed in the manufacture of aramid paper in an embodiment of the present invention.

Embodiments of the present invention will be described with reference to the accompanying drawings. Embodiments 1 to 5 and 6 to 10 are aramid-polyester laminates in accordance with the invention as shown in FIGS. 2 and 3. Each aramid-polyester laminate comprises a polyester film having one side on which aramid paper is thermally bonded directly without use of adhesive agent.

The aramid paper is made from aramid fibrids comprised of poly-meta-phenyleneisophthalamid (meta-aramid) and short fibers both as main constituents and formed into the shape of paper. The aramid paper has a surface (thermal bonding face) to which a low-temperature plasma treatment is applied such that the surface of aramid paper is provided with a property that the aramid paper is thermally bondable directly with another sheet of aramid paper of the same material or a polyester film at a thermal bonding temperature ranging from 90° C. to 200° C. when the surface of the aramid paper is treated by a low-temperature plasma treatment. The surface (thermal bonding face) of the aramid paper has a composition ratio X (O/C) of the number of oxygen atoms (O) to the number of carbon atoms (C) ranging between 120% and 250% of a theoretical value of an atom number ratio. The number of carbon atoms (C) and the number of oxygen atoms (O) are obtained by measurement on the surface of the aramid paper employing X-ray photoelectron spectroscopy (XPS). The theoretical value refers to the value of an atomic number ratio in a resin composition of the aramid paper.

Describing in more detail, commercially available aramid paper (Nomex #410 manufactured by DuPont, USA, for example) is employed as embodiments 1 to 10. Each sheet of aramid paper has a thickness of 2 mil (50 μm). The low-temperature plasma treatment is applied to a bonding side of each aramid paper sheet by a low-temperature plasma treatment apparatus 1 of the inner electrode type while the condition (treatment intensity) is changed. The apparatus 1 will be described later. The aforesaid treatment intensity ranges from 30 W·min/m² to 1500 W·min/m². More specifically, the treatment intensity is set to 50 W·min/m² in embodiments 1 and 6. The treatment intensity is set to 130 W·min/m² in embodiments 2 and 7. The treatment intensity is set to 650 W·min/m² in embodiments 3 and 8. The treatment intensity is set to 1120 W·min/m² in embodiments 4 and 9. The treatment intensity is set to 1400 W·min/m² in embodiments 5 and 10.

FIG. 1 illustrates the low-temperature plasma treatment carried out by the low-temperature plasma treatment apparatus 1. The low-temperature plasma treatment apparatus 1 includes a closable treatment chamber 2. A treatment roller 3 is provided in the treatment chamber 2. An electrode 4 is provided so as to surround the treatment roller 3 with a slight gap being defined therebetween. The electrode 4 is connected to a high-frequency power source 5. The treatment roller 3 is grounded although ground connection is not shown.

A valve 6 connected to a vacuum pump (not shown) is opened so that the interior of the treatment chamber 2 is depressurized. A valve 7 connected to a gas source (not shown) so that a treatment gas such as Ar or nitrogen is supplied to a treated (discharge) portion. A pressure gage 8 is provided for measuring the pressure in the treatment chamber 2. Pretreatment aramid paper F (original fabric) is drawn out of a roll thereof located at a supply section 9. While guided by plural guide rollers 10 in the treatment chamber 2, the aramid paper F is wound on a take-up reel 11 nearly one turn so as to pass through the gap between the roller 3 and the electrode 4. After the plasma treatment has been carried out at the part of the electrode 4, the aramid paper F is re-wound up onto the take-up reel 11 while being guided by the guide roller 10. The low-temperature plasma treatment is applied to both sides of the aramid paper F (or either thermal bonding face). As a result, the aramid paper of each of the embodiments 1 and 6 has a surface composition ratio X (O/C) set to 127% of the theoretical value. The aramid paper of each of the embodiments 2 and 7 has a surface composition ratio X (O/C) set to 174% of the theoretical value. The aramid paper of each of the embodiments 3 and 8 has a surface composition ratio X (O/C) set to 206% of the theoretical value. The aramid paper of each of the embodiments 4 and 9 has a surface composition ratio X (O/C) set to 213% of the theoretical value. The aramid paper of each of the embodiments 5 and 10 has a surface composition ratio X (O/C) set to 233% of the theoretical value.

A polyethylene terephthalate (PET) film is used as the polyester film to be affixed to the aramid paper in each of the embodiments 1 to 5. A polyethylene naphthalate (PEN) film is used as the polyester film to be affixed to the aramid paper in each of the embodiments 6 to 10. More specifically, a product sold under the trade name of Lumirror® X10 (manufactured by Toray Industries, Inc.) with a thickness of 188 μm is employed in each of the embodiments 1 to 5. A product sold under the trade name of Teonex® Q51 (manufactured by Teijin DuPont Films) with a thickness of 125 μm is employed in each of the embodiments 6 to 10. The adhesiveness improvement treatment is also applied to the surfaces of the PET and PEN films. The low-temperature plasma treatment apparatus 1 of the inner electrode type is also used so that the low-temperature treatment is carried out at 100 W·min/m². In this case, the composition ratio X (O/C) of each film surface ranges between 102.5% and 120% of the theoretical value.

The plasma-treated aramid paper (A) and polyester film (B) are thermally bonded directly with each other at or below 200° C., thereby being formed into the aramid-polyester laminate. Hot press is used for the thermal bonding. The aramid paper (A) and polyester film (B) are superposed on each other and interposed between hot plates heated so that upper and lower part temperatures reach 150° C., and pressure (20 kg/cm²) is applied to the aramid paper (A) and polyester film (B) for 10 minutes. Thereafter, pressure is discharged and a laminate is taken out thereby to be cooled so that the temperature thereof drops to the room temperature. Thus, a sample product is obtained.

On the other hand, each of comparative examples 1 to 4 is also an aramid-polyester laminate made by thermally bonding the aramid paper (A) and polyester film (B) directly but has different properties from those of the embodiments. No low-temperature plasma treatment is applied to the surface of the aramid paper in each of comparative examples 1 and 3. The low-temperature plasma treatment is applied to the aramid paper (A) with the treatment intensity exceeding the above-mentioned range (1500 W·min/m²) in each of comparative examples 2 and 4. More specifically, commercially available aramid paper (Nomex® #10 manufactured by DuPont, U.S.A., for example) with a thickness of 2 mil (50 μm) is employed. No low-temperature plasma treatment is applied to the surface of the aramid paper in each of comparative examples 1 and 3. As a result, the composition ratio X (O/C) of the atomic number of oxygen to the atomic number of carbon on each film surface is substantially equal to the theoretical value of atomic number ratio (100%). Furthermore, the treatment intensity of the low-temperature plasma treatment is set to 2050 W·min/m². Consequently, the composition ratio X (O/C) is 253% of the theoretical value.

Furthermore, each of comparative examples 1 and 2 employs a PET film (Lumirror® X10) with a thickness of 188 μm as the polyester film affixed to the aramid paper (A) as in the embodiments 1 to 5. Each of comparative examples 3 and 4 employs a PEN film (Teonex® Q51) with a thickness of 125 μm as the embodiments 6 to 10. The lamination of the aramid paper (A) and the polyester film (B) is carried out in the same manner as in each of the above embodiments 1 to 10.

An experiment was conducted in order that the interlayer adhesiveness (peel property) and bending property might be examined regarding the aforementioned embodiments 1 to 10 and comparative examples 1 to 4 for verification of the appropriateness of the present invention. FIGS. 2 and 3 show the results of the examination.

1. Interlayer Adhesion:

A 90 degree peel force was measured at the tensile speed of 50 mm/min. with respect to a sample with a width of 10 mm in accordance with Japanese Industrial Standards (JIS) C6481 using a tensile tester. When the peel force ranged from 1 N/cm to 0.5 N/cm, the interlayer adhesion was determined to be more than a practical level and good (◯). When the peel force was at or above 1 N/cm, the interlayer adhesion was determined to be particularly good (⊙). When the peel force was ranged from 0.5 N/cm to 0.2 N/cm, the interlayer adhesion was determined to be average (Δ). When the peel force was at or below 0.1 N/cm, the interlayer adhesion was determined to be disapproved (X).

2. Bending Work Ability:

A sample which was cut so as to have a width of 11 mm and a length of 30 cm was inserted into an automatic bending machine (manufactured by the assignee) so as to be bent for evaluation of bending work ability. The evaluation was visually made depending upon the presence or absence of appearance change such as float, strip or the like. When having no float, strip or the like, the sample was determined to be acceptable (◯). When having partial float, strip or the like, the sample was determined to be unacceptable (X) as a product.

As obvious from the experimental results, each of all the aramid-polyester laminates of embodiments 1 to 10 has a desired appearance after the bending test and achieves a bending work ability which has no problem in practical use. Furthermore, each of the embodiments 1 to 10 achieves an excellent interlayer adhesion. In particular, each of the embodiments 2 to 4 and 7 to 9 has the low-temperature plasma treatment intensity (output) ranging from 130 to 1200 W·min/m² and the composition ratio X ranging between 150% and 230% of the theoretical value. As a result, each of the embodiments 2 to 4 and 7 to 9 has a particularly excellent interlayer adhesion. The embodiment 3 achieves a most excellent interlayer adhesion above all.

On the other hand, no low-temperature plasma treatment is applied to the aramid paper of each of the comparative examples 1 and 3. No adhesive force can be obtained between the aramid paper and the polyester film in each of the comparative examples 1 and 3. Furthermore, the low-temperature plasma treatment applied to the aramid paper has the intensity (output) exceeded 1500 W·min/m² and the composition ratio X exceeding 250% of the theoretical value in each of the comparative examples 2 and 4. In this case, too, desired adhesive force cannot be obtained.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A method of manufacturing an aramid paper which is directly thermally bondable with the same material or a polyester film at a thermal bonding temperature ranging from 90° C. to 200° C., the method comprising:

obtaining an aramid paper made from aramid fibrid and short fiber both as main constituents and formed into a paper shape, the aramid paper having two sides and a surface and a thermal bonding face provided on at least one of the sides of the aramid paper; and applying a plasma treatment to the aramid paper by a plasma treatment apparatus with an inner electrode, the plasma treatment having an intensity ranging from 30 W·min/m² to 1500 W·min/m², wherein the thermal bonding face has a composition ratio (O/C) of the number of oxygen atoms (O) to the number of carbon atoms (C) ranging between 120% and 250% of a theoretical value of an atom number ratio.

2. The method of claim 1, wherein the composition ratio (O/C) ranges between 150% and 230%.

3. The method of claim 1, wherein the aramid fibrid comprises at least one of poly-meta-phenyleneisophthalamide, a copolymer thereof, or a mixed copolymer thereof.

4. The method of claim 1, wherein the plasma treatment is applied by at least one of a corona discharge under atmospheric pressure or a glow discharge in a vacuum.

5. The method of claim 4, wherein the plasma treatment is applied with a treatment gas selected from a group comprising helium, neon, argon, nitrogen, oxygen, carbon dioxide, air, and moisture vapor.

6. The method of claim 4, wherein the glow discharge is applied under a pressure from 0.1 Pa to 1330 Pa.

7. The method of claim 6, wherein the pressure is from 1 Pa to 266 Pa.

8. The method of claim 1, wherein the plasma treatment has an intensity ranging from 130 W·min/m² to 1200 W·min/m².

9. The method of claim 1, wherein the polyester film comprises at least one of polyethylene terephthalate, polyethylene napththalate, or polybutadiene terephthalate.

10. The method of claim 9, wherein the polyester film further comprises at least one of a copolymer, an additive for characteristic improvement, or a plasticizer.

11. The method of claim 10, wherein the additive is at least one of an organic or an inorganic filler.

12. The method of claim 1, wherein the thermal bonding temperature is about 150° C.

13. The method of claim 1, wherein the aramid paper is directly thermally bondable with the polyester film.

14. The method of claim 1, wherein the aramid paper is directly thermally bondable with the same material.

* * * * *